(12) United States Patent
Paquet et al.

(10) Patent No.: US 6,568,161 B1
(45) Date of Patent: May 27, 2003

(54) USER INTERFACE FOR A HARVESTING MACHINE

(75) Inventors: Bert J. F. Paquet, Sint-Andries (BE); Steven C. Young, Lancaster, PA (US); Dries M. J. Depreitere, Koekelare (BE)

(73) Assignee: New Holland North America, Inc., New Holland, PA (US)

( * ) Notice: Subject to any disclaimer, the term of this patent is extended or adjusted under 35 U.S.C. 154(b) by 28 days.

(21) Appl. No.: 09/987,627

(22) Filed: Nov. 15, 2001

(51) Int. Cl.[7] .............................................. A01D 75/00
(52) U.S. Cl. .................................... 56/10.2 E; 56/10.8
(58) Field of Search ......................... 56/10.2 R, 10.2 E, 56/10.8

(56) References Cited

U.S. PATENT DOCUMENTS

| | | |
|---|---|---|
| 4,733,523 A | 3/1988 | Dedeyne et al. |
| 5,473,870 A * | 12/1995 | Panoushek et al. ...... 56/10.2 E |
| 5,713,190 A | 2/1998 | Vermeulen et al. |
| 5,721,679 A | 2/1998 | Monson |
| 5,880,684 A | 3/1999 | Diekhans et al. |
| 5,978,720 A | 11/1999 | Hieronymus et al. |
| 6,068,059 A * | 5/2000 | Bajema et al. ............. 171/130 |
| 6,141,612 A * | 10/2000 | Flamme et al. ............. 701/50 |
| 6,148,593 A | 11/2000 | Heinsey et al. |
| 6,272,819 B1 | 8/2001 | Wendte et al. |
| 6,282,476 B1 | 8/2001 | Hieronymus et al. |

* cited by examiner

*Primary Examiner*—Thomas B. Will
*Assistant Examiner*—Meredith Petravick
(74) *Attorney, Agent, or Firm*—John William Stader; A. Nicholas Trausch; Rebecca L. Henkel

(57) ABSTRACT

A user interface for a harvesting machine, such as a combine harvester, having a position adjustable header implement. Specifically, the user interface is operationally connected to a microcomputer that controls a position adjusting apparatus for positioning the position adjustable header implement. The user interface includes two rocker key switches for selecting between, and subsequently adjusting, two operational modes for the position adjusting apparatus, being a stubble height mode and a pressure compensation mode of operation.

8 Claims, 4 Drawing Sheets

USER INTERFACE FOR A HARVESTING MACHINE

FIELD OF THE INVENTION

The present invention pertains to a user interface for activating an apparatus for controlling the position, specifically the height, of a position adjustable implement relative to a surface such as the ground. The position adjustable implement is preferably, but not necessarily, carried by a motorized vehicle that moves over the surface and the position adjustable implement is preferably, by not necessarily, a crop harvesting implement such as would be found on a harvesting machine, or combine harvester.

BACKGROUND OF THE INVENTION

As is well known in the art of agriculture and farm equipment, it is important to control the height of a header implement carried by a harvesting machine relative to the ground with a high degree of precision and accuracy. It is also important that the harvesting implement be capable of rapidly reacting to changes in the height of the terrain in order to maintain a relatively constant height in relation to the ground.

One example of an apparatus for controlling the position of a header for a harvesting machine is U.S. Pat. No. 5,713,190 to Vermeulen et al., which is herein incorporated by reference. Specifically, the header, being a position-adjustable farming implement, is automatically height adjusted by a position adjusting apparatus including one or more pivotable shoes that are dragged along the ground and each shoe has a reflecting surface for reflecting an ultrasonic signal emitted by a transceiver back to the emitting transceiver, which can also detect the reflected signal. The transceiver is part of an electronic control circuit, which is the electronic component of the apparatus for controlling the position of the header. The reflected signal is detected by the transceiver which acts as both the signal emitter and the signal detector, and the detected signal is electronically inputted via an ultrasonic sensor interface into a microcomputer that processes the information to determine by how much the header must be moved relative to the ground to maintain a relatively constant distance (height) from the ground. When the position adjusting apparatus utilizes the reflective shoes and the ultrasonic signals to determine how much the header position needs to be adjusted, the apparatus is said to be operating in a "stubble height mode." The position adjusting apparatus includes a hydraulic valve that is operationally connected to the microcomputer via the stubble height interface, and the valve controls hydraulic heading lifting cylinders when the apparatus is operating in the stubble height mode.

However, the position adjusting apparatus also includes a hydraulic valve that is connected to the microcomputer via a pressure compensation interface. The hydraulic valve controls a hydropneumatic accumulator, and via a control line, also controls header lifting cylinders. Both the accumulator and the lifting cylinders are well known in the art for adjusting the position of the header. Oil pressure sensors are disposed within the header lifting cylinders to measure the oil pressure in the cylinders. This pressure information is transmitted via a pressure sensor interface to input into the microcomputer that controls the header position. Measuring the oil pressure in the cylinders is useful because the hydraulic oil pressure is related to, and a function of, the ground pressure of the header as it presses against the ground as the header rides along the contour of the ground surface.

When the microcomputer adjusts the height of the header in response to the oil pressure in the header lifting cylinders, the position adjusting apparatus is said to be operating in the "pressure compensation mode." Although the microcomputer can adjust the height of the header in response to data input from either the ultrasonic sensors or the hydraulic pressure sensors, the microcomputer can not adjust the height of the header in response to simultaneous data from both the ultrasonic sensors and the hydraulic pressure sensors. In other words, the microcomputer, being a means for processing input data for selecting between and incrementing a stubble height mode and a pressure compensation mode, and the position adjusting apparatus operate exclusively in either the stubble height mode or the pressure compensation mode, but never simultaneously in both modes.

Consequently, there is a need for a user interface, and the prior art user interface 60 as shown in FIG. 1 has a portion 62 for inputting into the microcomputer data determining which mode of operation the position adjusting apparatus will operate in, being either the stubble height mode or the pressure compensation mode. Preferably, the user interface portion 62 also permits data input for adjusting the selected mode of operation by positively or negatively incrementing the selected mode of operation.

As illustrated in FIG. 1 the prior art user interface 60 includes three rotatable control knobs 64, 66, and 68. User interface 60 is a control panel or dashboard typically located in the cab of the harvester where the operator positions himself while operating the machine, and the interface 60 may have other controls for operating the harvester. However, control knobs 64, 66 and 68 are specifically present in portion 62 to select and control the mode of operation for the position adjusting apparatus. Knob 66 is used to select either one of the stubble height mode or the pressure compensation mode by turning the knob 66 to the left or the right, thereby selecting respectively either the stubble height mode or the pressure compensation mode. Knob 64 operates to either positively (increase) or negatively (decrease) increment the stubble height position when the stubble height mode of operation is selected. When the stubble height mode is selected, knob 64 is enabled whereas knob 68 is not enabled. Knob 68 operates to either positively (increase) or negatively (decrease) increment the compensation pressure when the pressure compensation mode of operation is selected. When the pressure compensation mode is selected, knob 68 is enabled and knob 64 is not enabled.

In other words, knob 66 is used to select the mode of operation and knobs 64 and 68 are the adjustment knobs for incrementing (increasing or decreasing) the stubble height or the compensation pressure respectively for affecting the position of the position adjusting apparatus. However, this user interface has several drawbacks. First, three control knobs are required to enable the operator to select back and forth between the two modes of operation and to increment the two modes of operation. This inefficient use of control switches takes up more room on the user interface 60 that could be used for other controls. Furthermore, having three knobs to choose from overly complicates the control panel and may contribute to operator error. Also, having rotatable knobs may result in accidental over adjustment of either the stubble height or the compensation pressure that consequently mispositions the header and predisposes the header to damage against the ground. Lastly, having three knobs 64, 66, and 68 necessarily means six inputs into the microcomputer which uses up ports to the microcomputer that could be used for other data inputs.

SUMMARY OF THE INVENTION

The present invention endeavors to provide an improved and simplified user interface for operating and adjusting apposition adjustment apparatus that controls the position of a position adjustable header implement of a harvesting machine that overcomes the drawbacks of the prior art user interface.

Another object of the present invention is to provide a less confusing user interface that is space efficient.

Further object of the present invention is to provide a user interface that decreases the likelihood of accidental position overcorrection and damage to a position adjustable agricultural implement such as a header for a harvesting combine.

Still further object of the present invention is to provide a user interface that requires fewer than five microcomputer input ports for selecting and incrementing between a stubble height mode and a pressure compensation mode of operation for a position adjusting apparatus.

Yet another object of the present invention is to provide a user interface that utilizes two operable rocker keys for selecting and incrementing between a stubble height mode and a pressure compensation mode of operation for a position adjusting apparatus.

The present invention achieves the stated objectives and provides a simplified user interface for selecting between and incrementing a stubble height mode and a pressure compensation mode of operation for a position adjusting apparatus that positions the header of a harvesting machine by using the user interface comprising a means for processing input data for selecting between and incrementing a stubble height mode and a pressure compensation mode of operation of the position adjustment apparatus, wherein the position adjustment apparatus positions the header implement in response to an output signal generated by the means for processing input data to maintain a selected stable height position or a selected compensation pressure; a mode control switch for inputting data to the means for processing input data, wherein the mode control switch permits selective activation of either the stubble height mode or the pressure compensation mode; and an increment key for inputting data to the means for processing input data, wherein the increment key permits positive or negative incrementing of the mode selectively activated by the mode control switch.

Other features, advantages and improvements of the present invention over the prior art user interface will be plainly evident from the Detailed Description of the Invention when considered together with the attached drawings.

DETAILED DESCRIPTION OF THE INVENTION

Figure 1:
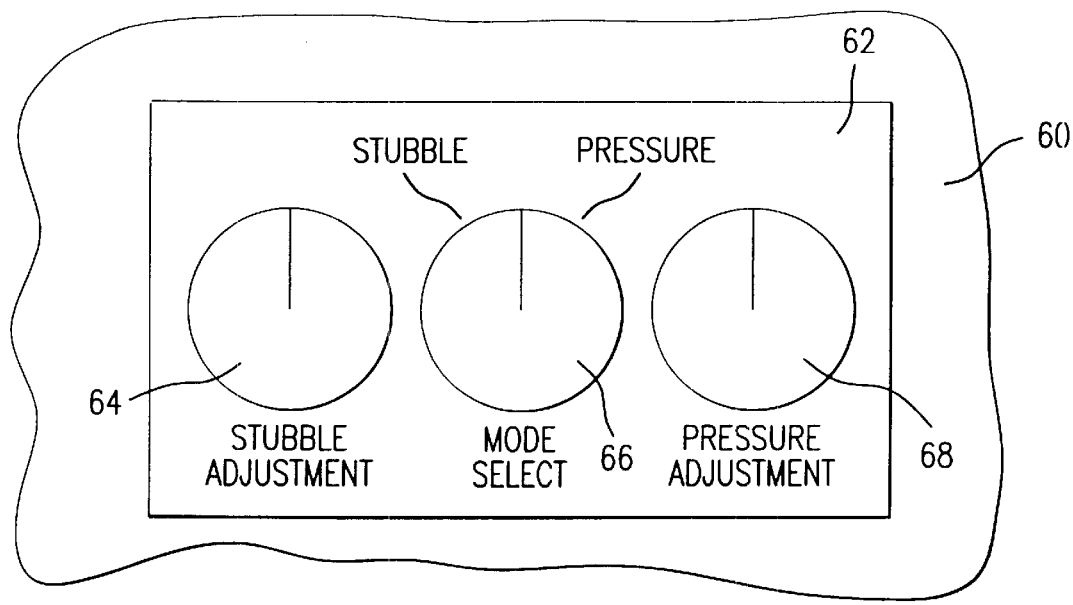
FIG. 1 is an illustration of the prior art position control user interface having three rotatable knobs.
Figure 2:
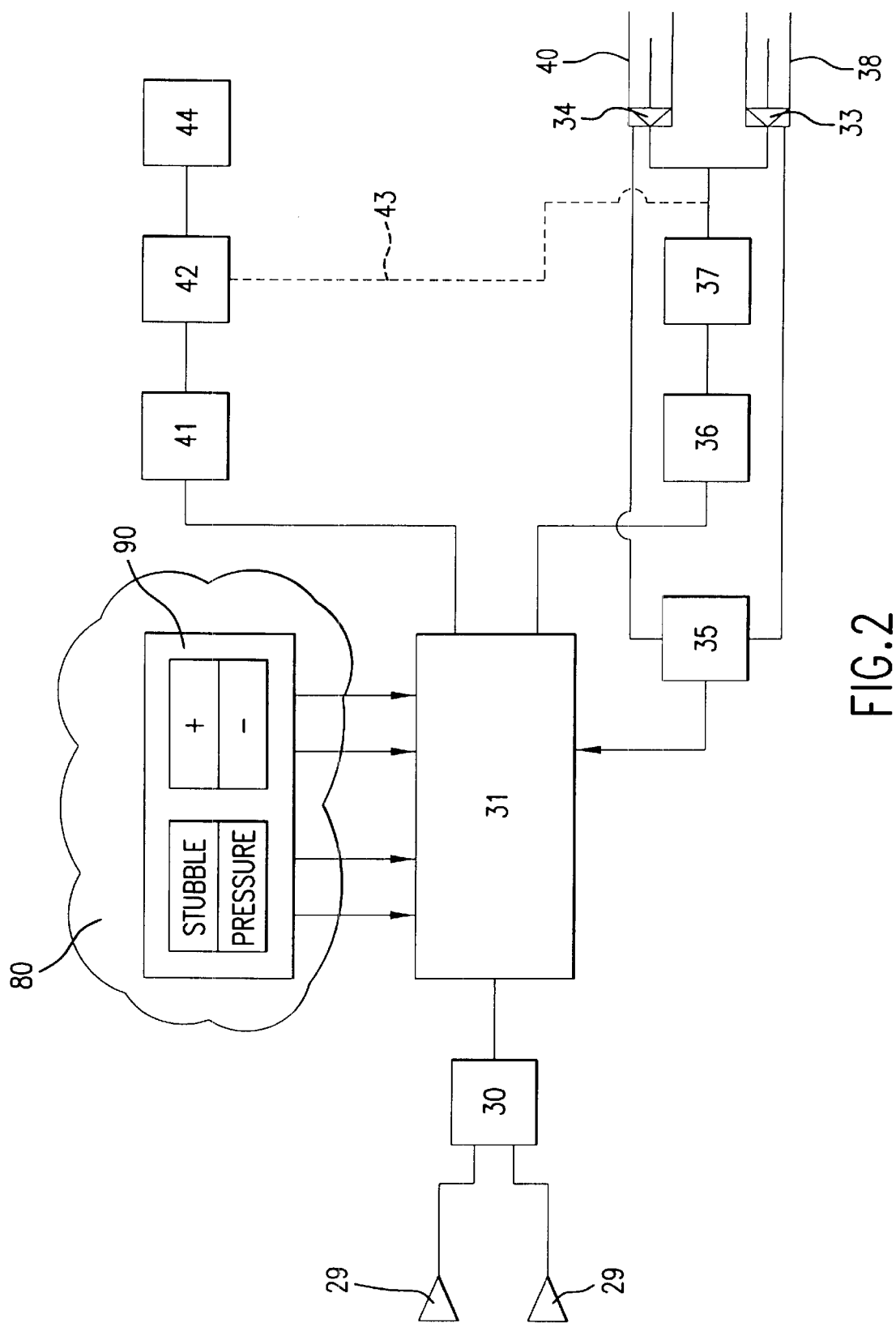
FIG. 2 is a schematic illustration of the position adjusting apparatus of a harvesting machine including the user interface of the present invention.

The user interface of the present invention replaces the prior art user interface 60 shown in FIG. 1. The remaining components of the harvesting machine or combine, such as the header implement, are well known in the art and need no further explanation. As schematically illustrated in FIG. 2, the position adjusting apparatus of the present invention includes a microcomputer or microprocessor 31 electronically connected to receive signals from a pair of ultrasonic sensors 29 and a pair of hydraulic pressure sensors 33 and 34 that have been respectively relayed through ultrasonic sensor interface 30 and hydraulic sensor interface 35. While an ultrasonic sensor 29 is the preferred embodiment, it should be understood that various mechanical sensing devices may also be utilized. For instance, a rotary-type sensor operably affixed to a header skid plate or the like, that contact the ground could also provide the required senory input. Furthermore, it is possible to us a single pressure sensor 33. However, the preferred embodiment uses a pair of pressure sensors 22 and 34. Microcomputer 31 also receives input signals from user interface portion 90. User interface portion 90 is part of a larger user interface 80 that includes other controls for operating the harvesting machine that may or may not additionally input data into microcomputer 31. The present invention, a simplified and more elegant user interface, is illustrated by two primary embodiments described below.

However, the position adjusting apparatus also includes devices for receiving signals outputted from microcomputer 31 such as hydraulic valve 37, which is operationally connected to microcomputer 31 via the stubble height interface 36. Valve 37 operates the hydraulic heading lifting cylinders 38 and 40 when the position adjusting apparatus is operating in the stubble height mode. The position adjusting apparatus also includes hydraulic valve 42 connected to the microcomputer 31 via pressure compensation interface 41. Valve 42 operates a hydropneumatic accumulator 44, and via control line 43 also operates the header lifting cylinders 38 and 40. Oil pressure sensors 33, 34 are disposed within the header lifting cylinders 38 and 40 to measure the oil pressure in the cylinders. Pressure information is transmitted via pressure sensor interface 35 to input into microcomputer 31 that controls the header position when the position adjusting apparatus is operating in the pressure compensation mode.

Although microcomputer 31 can adjust the height of the header in response to data input signals from both the ultrasonic sensors 29 and the hydraulic pressure sensors 33, 34, the microcomputer 31 cannot adjust the height of the header in response to simultaneous data from both the ultrasonic sensors and the hydraulic pressure sensors. Consequently, a portion 90 of user interface 80 of the present invention is used to select and switch the position adjusting apparatus operation between the stubble height mode and the pressure compensation mode, and to positively and negatively increment the selected mode of operation.

Figure 3B:
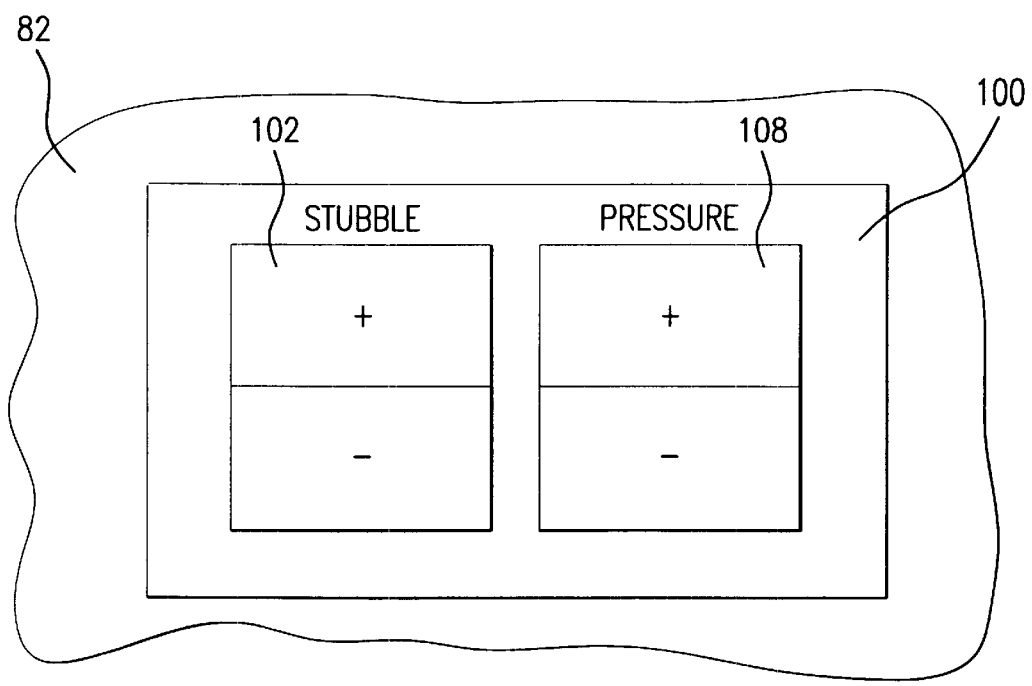
FIG. 3B illustrates another preferred embodiment of the user interface rocker control switches of the present invention.
Figure 3A:
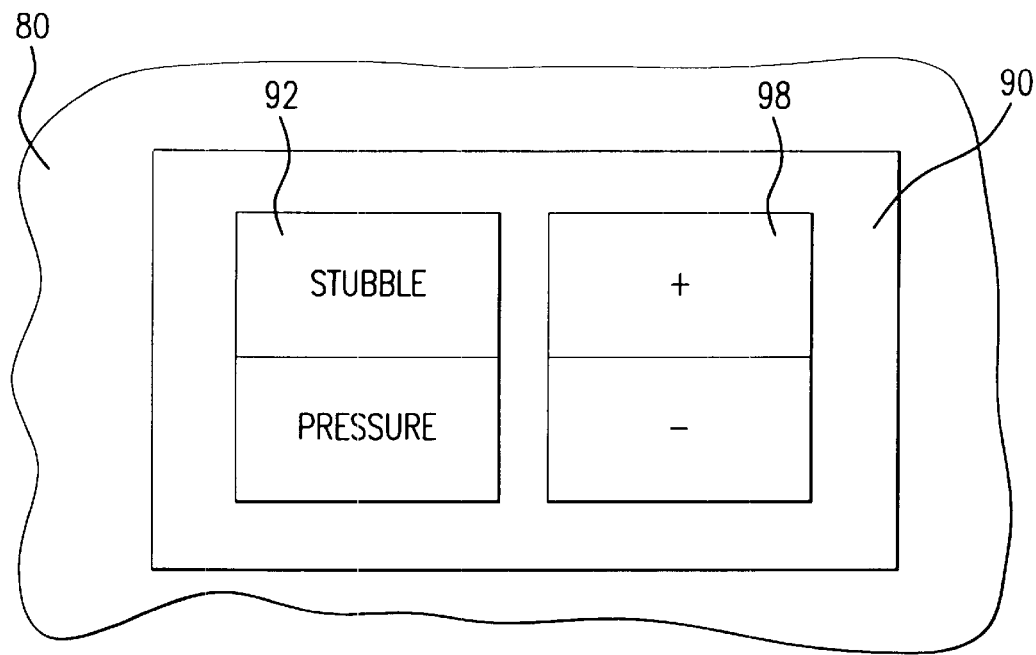
FIG. 3A illustrates one preferred embodiment of the user interface rocker control switches of the present invention.
Figure 4A:
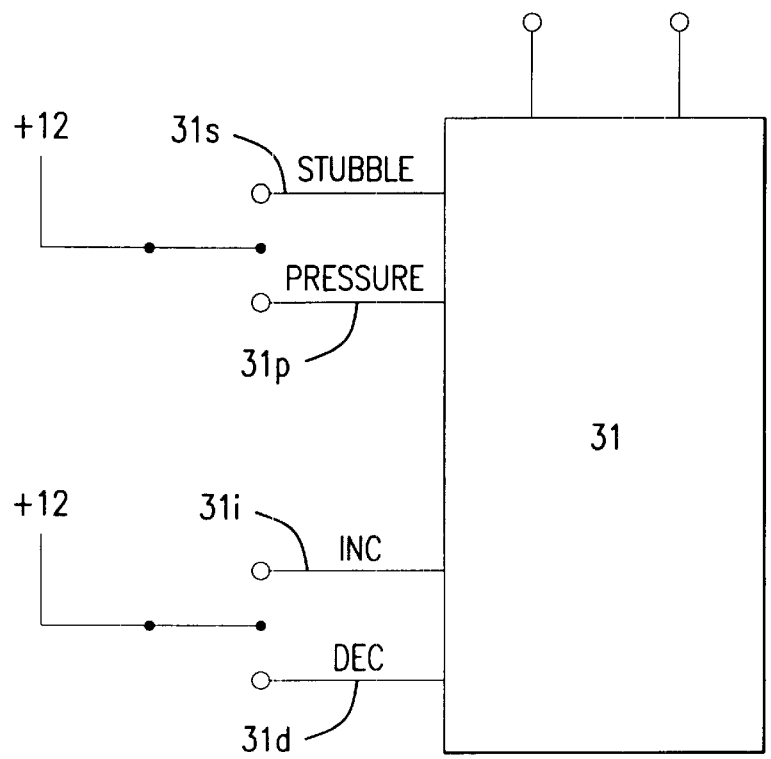
FIG. 4A illustrates the user interface control circuit of FIG. 3A.

The first preferred embodiment of the present invention as best illustrated in FIGS. 3A and 4A comprises a user interface 80 that has a portion 90 devoted to selecting and incrementing between a stubble height mode and a pressure compensation mode of operation of the prior art position adjusting apparatus. User interface 80 is typically a control panel or dashboard in the cab of the harvesting machine where a user operates the harvesting machine, although the user interface 80 can be in practice anywhere on the harvesting machine or even at a location remote from the harvesting machine so long as the user interface 80 is electronically connected to the microcomputer 31 that generates the output signals for controlling the position adjusting apparatus.

Portion 90 of the user interface includes two rocker type control switches 92 and 98. Rocker switch 92 is used to select the mode of operation, either the stubble height mode or the pressure compensation mode. When a user presses down the upper or "stubble" portion of rocker switch 92 then the stubble height mode of operation is enabled and the pressure compensation mode is not enabled. Likewise, when the user presses down on the lower or "pressure" portion of rocker switch 92, then the pressure compensation mode of operation is enabled and the stubble height mode is not enabled. Once a mode has been enabled, further pressing of the portion of switch 92 corresponding to the enabled mode will generate an input signal but the signal will have no effect on the microcomputer 31. For example, if the stubble height mode is in operation, subsequent pressing on the upper portion of switch 92 will produce no additional effect but pressing on the lower portion of switch 92 will activate the pressure compensation mode and deactivate the stubble height mode. Likewise, if the pressure compensation mode is in operation, subsequent pressing on the lower portion of switch 92 will produce no additional effect but pressing on the upper portion of switch 92 will activate the stubble height mode and deactivate the pressure compensation mode.

As shown in FIG. 4A a 12 V energy source, or any other suitable energy source, provides the selection signal input 31s or 31p to the microcomputer 31 depending upon which mode, stubble height or pressure compensation respectively, is activated by the switch 92, and the microcomputer 31 activates the corresponding operational mode according to which signal is received. Clearly, both modes can not be enabled simultaneously by switch 92; therefore, switch 92 is substantially a selection switch for selecting the mode of operation that will be activated or enabled by the microcomputer 31. It is pointed out that it is within the scope of the invention of the first embodiment to program the microprocessor 31 to default the position adjusting apparatus to initially operate in either the stubble height mode of operation, the pressure compensation mode of operation, or to a "no mode" or inoperative status when the harvesting machine is turned on. Preferably, the default mode is programmed to be either the stubble height mode or the pressure compensation mode so that one of these two modes are in operation to protect the header from damage due to inadvertent mispositioning.

In the first preferred embodiment, rocker switch 98 is an incrementing switch and is used to positively increment (increase) or negatively increment (decrease) which ever operational mode has been selected to operate by switch 92. By pressing the upper or "+" portion of rocker switch 98 the user positively increments the enabled mode. Likewise, by pressing the lower or "−" portion of rocker switch 98 the user negatively increments the enabled mode. Each press of the upper or lower portion of rocker switch 98 sends a respective signal 31i or 31d from the 12 V energy source, or any other suitable energy source, to the microcomputer 31 and the microcomputer 31 processes the incrementing input signal 31i or 31d and subsequently positively or negatively increments the enabled mode in accordance with the pressed "+" or "−" portion of the rocker switch 98. In other words, each press of the "+" portion of switch 98 effects one positive increment in the selected mode and each press of the "−" portion of switch 98 effects one negative increment in the selected mode. In this embodiment, it is within the scope of the invention to program the microcomputer 31 to effect one positive or negative increment respectively for each pressing of the upper or lower portion of switch 98 so that a single sustained pressing effects only one increment. In this embodiment, it is within the scope of the invention to program the microcomputer 31 to automatically reset the input ports so that the microcomputer 31 processes one long sustained pressing (signal) of the upper or the lower portion of switch 98 as multiple discrete pressings (signals) of the respective pressed portion. Therefore, pressing and holding down the upper portion of switch 98 for a sustained period will effect multiple positive increments; and likewise, pressing and holding down the lower portion of switch 98 for a sustained period will effect multiple negative increments.

In summary for the first preferred embodiment, the user interface portion 90 includes a selection switch 92 and an increment switch 98, wherein the selection switch 92 is dedicated to activating or enabling the selected mode but is unable to increment the selected mode and the increment switch 98 is dedicated to incrementing the selected mode but is unable to be used to select the activated mode. Furthermore, it is pointed out that switch 98 can only effect positive or negative increments within a preset range as is set by the microcomputer 31. In other words, once the selected mode has been positively incremented to a maximum positive value, further signals generated by pressing the "+" portion of switch 98 will have no effect on the position adjusting apparatus. The position adjusting apparatus will be affected only by pressing on the "−" portion of the rocker switch 98 when the maximum positive value has been reached. Likewise, once the selected mode has been negatively incremented to a maximum negative value, then further signals generated by pressing the "−" portion of switch 98 will have no effect on the position adjusting apparatus. The position adjusting apparatus will be affected only by pressing on the "+" portion of the rocker switch 98 when the maximum negative value has been reached.

Figure 4B:
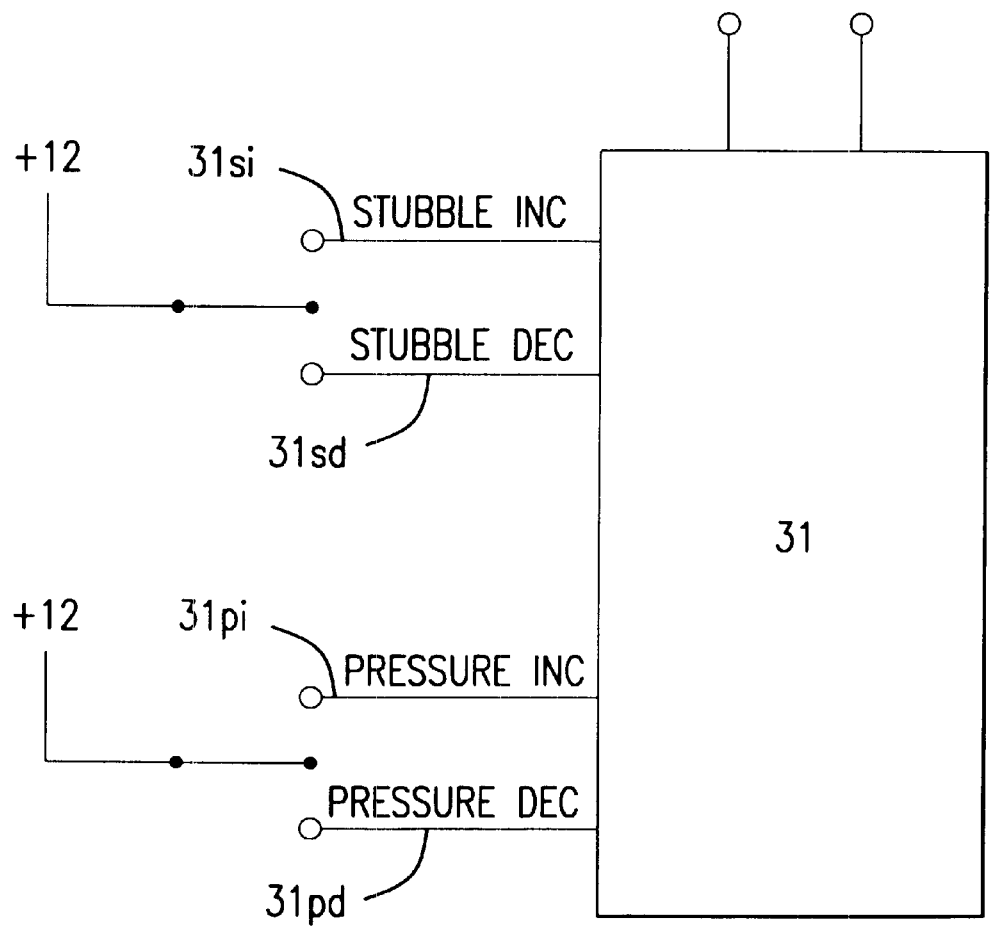
FIG. 4B illustrates the user interface control circuit of FIG. 3B.

The second preferred embodiment of the present invention as illustrated in FIGS. 3B and 4B comprises a user interface 82 that has a portion 100 devoted to selecting and incrementing between a stubble height mode and a pressure compensation mode of operation. User interface 82 is typically a control panel or dashboard in the cab of the harvesting machine where a user operates the harvesting machine, although the user interface 82 can be in practice anywhere on the harvesting machine or even at a location remote from the harvesting machine so long as the user interface 82 is electronically connected to the microcomputer 31 that generates the output signals for controlling the position adjusting apparatus.

Portion 100 of the user interface includes two rocker type control switches 102 and 108, with each switch having a respective upper, or "+", portion and a respective lower, or "−" portion. Rocker switch 102 is used to activate or enable the stubble height mode of operation, and is subsequently used to positively and negatively increment the stubble height mode. Rocker switch 102 primarily affects the stubble height mode of operation by activating and adjusting this mode, and its only effect on the pressure compensation mode is to deactivate or disable the pressure compensation mode as described below. Similarly, rocker switch 108 is used to activate or enable the pressure compensation mode of operation, and is subsequently used to positively and negatively increment the pressure compensation mode. Rocker switch 108 primarily affects the pressure compensation mode of operation by activating and adjusting this mode, and its only effect on the stubble height mode is to deactivate or disable the stubble height mode as also described below.

In practice, when the harvesting machine is energized or "turned on" by an ignition key or starter button, the machine's electrical system is energized by a battery or an electric generator, which generates the electrical power to energize the microcomputer 31 that controls the position adjusting apparatus. The microprocessor 31 can be programmed to default the position adjusting apparatus to initially operate in either the stubble height mode of operation, the pressure compensation mode of operation, or to a "no mode" or inoperative status when the harvesting machine is turned on. Preferably, the default mode is programmed to be either the stubble height mode or the pressure compensation mode so that one of these two modes are in operation to protect the header from damage due to inadvertent mispositioning.

Assuming that the position adjustment apparatus is already operating in the stubble height mode, the function of rocker switch 102, or the "stubble key," will be described with reference to FIGS. 3B and 4B. With the stubble height mode already activated or engaged, pressing on the upper, "+", or portion of stubble key 102 results in the "+"-portion signal 31$si$ generated by the 12 V energy source, or any other suitable energy source, being transmitted to the microcomputer 31. The microcomputer 31 processes the "+"-portion signal 31$si$ and positively increments the stubble height mode. Each separate pressing action generates another "+"-portion input signal 31$si$ effecting a positive increment of the stubble height mode. Alternately, the microprocessor 31 is programmed to automatically reset the input port for receiving the "+"-portion input signal 31$si$ so that a sustained pressing of the "+" portion of key 102 will be processed by the microprocessor 31 to have the same effect as if the "+" portion of key 102 had been pressed multiple discrete times.

As described above for the increment key 98 of the first embodiment, the incrementing function of stubble key 102 is limited to effecting a preset range of stubble height position settings as preprogrammed into the microcomputer 31. Specifically, once the stubble height mode has been positively incremented to a maximum positive value, then further signals 31$si$ generated by pressing the "+" portion of key 102 will have no effect on the position adjusting apparatus; however, pressing on the "−" portion of key 102 will result in a negative increment and a subsequent pressing of the "+" portion of key 102 will effect a corresponding positive increment. Likewise, once the stubble height mode has been negatively incremented to a maximum negative value, then further signals 31$sd$ generated by pressing the "−" portion of key 102 will have no effect on the position adjusting apparatus; although, pressing the "+" portion of key 102 will effect a positive increment and enable a subsequent pressing of the "−" portion of key 102 to effect a corresponding negative increment.

In a similar fashion with the stubble height mode already activated or engaged, pressing on the lower, or "−", portion of stubble key 102 results in the "−"-portion signal 31$sd$ generated by the 12 V energy source, or any other suitable energy source, being transmitted to the microcomputer 31. The microcomputer 31 processes the "−"-portion signal 31$sd$ and negatively increments the stubble height mode. Each separate pressing action generates another "−"-portion input signal 31$sd$ effecting a negative increment of the stubble height mode. Alternately, the microprocessor 31 is programmed to automatically reset the input port for receiving the "−"-portion input signal 31$sd$ so that a sustained pressing of the "−" portion of key 102 will be processed by the microprocessor 31 to have the same effect as if the "−" portion of key 102 had been pressed multiple discrete times.

In addition, both the positive and negative incrementing functions of stubble key 102 are limited to effecting a preset range of stubble height position settings as preprogrammed into the microcomputer 31. Specifically, once the stubble height mode has been negatively incremented to a maximum negative value, then further signals 31$sd$ generated by pressing the "−" portion of key 102 will have no additional effect on the position adjusting apparatus; however, pressing on the "+" portion of key 102 will result in a positive increment thereby permitting a subsequent pressing of the "−" portion of key 102 to effect a corresponding negative increment.

Rocker key 108, or the "pressure key," is similar to the stubble key 102 except that the pressure key 108 activates and adjusts the pressure compensation operational mode. Referring to FIGS. 3B and 4B and assuming that the position adjusting apparatus is presently operating in the stubble height mode, pressing on the upper, or "+" portion, of the pressure key 108 will activate or engage the pressure compensation mode and deactivate or disengage the stubble height mode. Specifically, this first activation of the "+" portion of the pressure key 108 results in transmission of signal 31$pi$ provided by the 12 V energy source, or any other suitable energy source, to a corresponding input port of microcomputer 31. Microcomputer 31 is preprogrammed to process the first 31$pi$ signal while operating the stubble height mode as a switching signal for initiating the activation of the pressure compensation mode and deactivation of the stubble height mode. Once the position adjusting apparatus has been switched to the pressure compensation mode, subsequent operation or pressing of the "+" portion of pressure key 108 transmits subsequent signals 31$pi$ that are processed by microcomputer 31 as positive incrementing signals. In other words, once the pressure compensation mode has been activated and the stubble height mode deactivated, each pressing of the "+" portion of key 108 generates a signal 31$pi$ that is processed by the microcomputer 31 as a positive incrementing signal so that the microcomputer output effects a positive increment in the pressure compensation mode. In addition, the microcomputer 31 can be preprogrammed so that each separate and distinct signal 31$pi$ effects a positive increment in the pressure compensation mode, or the microcomputer 31 can be preprogrammed so that a sustained pressing of the "+" portion of key 108 is processed as equivalent to multiple discrete pressings and effect multiple discrete positive increments being similar in function to the "+" portion of key 102. Likewise, the "−" portion of pressure key 108 transmits signal 31$pd$ from the 12 V energy source, or other equivalent energy source, to the microcomputer 31 when pressed and the microcomputer processes this signal as a negative incrementing signal. Therefore, for each signal 31$pd$ transmitted to the microcomputer input, the microcomputer effects a negative increment to the pressure compensation mode. And it would be evident to one skilled in the art given the discussion above that microprocessor 31 could be preprogrammed to either process each discrete signal 31$pd$ to effect one discrete negative increment or to process a long and sustained signal 31$pd$ as equivalent to multiple discrete shorter signals thereby effecting multiple negative discrete increments. It would also be evident to one skilled in the art that the microcomputer 31 could be preprogrammed to process the first 31$pi$ signal as the mode switching signal as described above, or to process the first 31$pd$ signal as the mode switching signal, or to process either the first 31$pi$ signal or the first 31$pd$ signal as the switching signal.

In summary, the second preferred embodiment of the invention utilizes two rocker keys, being stubble key 102 and pressure key 108, for respectively both activating and incrementing the stubble height mode and the pressure compensation mode. Although not explicitly stated above, it should be clear to one skilled in the art that when the position adjustment apparatus is operating in the pressure compensation mode that pressing the "+" portion of the stubble key 102 would generate a first 31si signal that would be processed by the microcomputer 31 as a mode switching signal thereby resulting in the activation of the stubble height mode and the deactivation of the pressure compensation mode, and that subsequent signals 31si and 31sd would effect respectively positive and negative increments in the stubble height mode. It would also be evident to one skilled in the art that the microcomputer 31 could be preprogrammed so that a first 31sd signal, or either one of a first 31si signal or a first 31sd signal would be processed as the mode switching signal when the position adjusting apparatus is operating in the pressure compensation mode.

Furthermore, it would be evident to one skilled in the art that the positive and negative incrementing function of the pressure key 108 would be limited to a preset range of compensation pressures preprogrammed into the microprocessor 31 so that beyond a maximum positive pressure increment and beyond a maximum negative pressure increment pressing or activating respectively the "+" portion and the "+" apportion of key 108 would not effect a corresponding pressure increment for the position adjusting apparatus. In other words, key 108 can not effect pressure increment changes outside of the range of pressure increments preprogrammed into the microcomputer 31.

While the present invention has been illustrated by certain preferred embodiments, one of ordinary skill in the art will recognize that additions, deletions, substitutions, modifications and improvements can be made while remaining within the scope and spirit of the present invention as defined by the appended claims.

The invention claimed is:

1. A user interface for a position adjustment apparatus that controls the position of a position adjustable header implement relative to a surface, the interface comprising:
    a means for processing input data for selecting between and incrementing a stubble height mode and a pressure compensation mode of operation of the position adjustment apparatus, wherein the position adjustment apparatus positions the header implement in response to an output signal generated by the means for processing input data to maintain a selected stable height position or a selected compensation pressure;
    a mode control switch for inputting data to the means for processing input data, wherein the mode control switch permits selective activation of either the stubble height mode or the pressure compensation mode;
    a first increment key for inputting data to the means for processing input data, wherein the first increment key permits positive or negative incrementing of the mode selectively activated by the mode control switch; and
    wherein the mode control switch activates the mode selectively activated from the group of modes consisting of a stubble height mode and a pressure compensation mode, so that a first pressing of the first increment key results in the switch activating the stubble height mode, the user interface further comprising a second increment key for inputting data to the means for processing input data, so that a first pressing of the second increment key results in the switch activating the pressure compensation mode.

2. A user interface according to claim 1, wherein the first increment key has an upper portion and a lower portion so that pressing the upper portion results in a positive increment of the mode selectively activated and pressing the lower portion results in a negative increment of the mode selectively activated.

3. A user interface according to claim 1, wherein a second pressing of the first increment key effects a positive or negative increment in the stubble height mode, and a second pressing of the second increment key effects a positive or negative increment in the pressure compensation mode.

4. A user interface according to claim 3, wherein the first increment key and the second increment key each have an upper portion and lower portion respectively, so that pressing the respective upper portion positively increments the corresponding activated mode and pressing the respective lower portion negatively increments the corresponding activated mode.

5. A harvesting machine comprising a position adjusting apparatus for positioning a header implement, wherein the position adjusting apparatus includes a user interface, wherein the user interface is the user interface of claim 1.

6. A position adjustment apparatus for a harvesting machine, the apparatus controlling the position of a position adjustable header implement relative to a surface and having a user interface, the interface comprising: a first key operationally connected to a microcomputer; and
    a second key operationally connected to a microcomputer so that activation of at least one of the first key and the second key activates a selected mode of operation and that activation of at least one of the first key and the second key positively or negatively increments the selected mode; and
    the first key activates and increments a stubble height operational mode and the second key activates and increments a pressure compensation operational mode.

7. A position adjusting apparatus according to claim 6, wherein a first signal resulting from pressing the first key activates the stubble height mode and a subsequent signal resulting from subsequently pressing the first key increments the stubble height mode, whereas a first signal from pressing the second key activates the pressure compensation mode and a subsequent signal resulting from subsequently pressing the second key increments the pressure compensation mode.

8. A position adjusting apparatus according to claim 7, wherein the first key and the second key respectively each have an upper portion and a lower portion such that pressing the respective upper portion results in a positive increment in the corresponding activated mode and pressing the respective lower portion results in a negative increment in the corresponding activated mode.

* * * * *